(12) United States Patent
Higashida (10) Patent No.: US 6,233,673 B1
(45) Date of Patent: May 15, 2001

(54) IN-CIRCUIT EMULATOR WITH INTERNAL TRACE MEMORY

(75) Inventor: Motoki Higashida, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/130,349

(22) Filed: Aug. 13, 1998

(30) Foreign Application Priority Data

Mar. 27, 1998 (JP) .................................................. 10-082198

(51) Int. Cl.[7] ...................................................... G06F 9/455
(52) U.S. Cl. .............................. 712/227; 714/28; 714/29; 714/33
(58) Field of Search ............................... 714/34, 45, 736, 714/28, 29, 33; 712/227

(56) References Cited

U.S. PATENT DOCUMENTS

| | | | | |
|---|---|---|---|---|
| 4,674,089 | * | 6/1987 | Poret et al. ........................... | 714/736 |
| 5,053,949 | * | 10/1991 | Allison et al. ........................ | 364/200 |
| 5,317,711 | * | 5/1994 | Bourekas et al. ..................... | 714/733 |
| 5,560,036 | | 9/1996 | Yoshida . | |
| 5,586,279 | * | 12/1996 | Pardo et al. .......................... | 395/403 |
| 5,594,890 | * | 1/1997 | Yamaura et al. ..................... | 395/500 |
| 5,689,694 | * | 11/1997 | Funyu ................................... | 712/234 |
| 5,812,830 | * | 9/1998 | Naaseh-Shahry et al. .......... | 713/400 |
| 5,848,264 | * | 12/1998 | Baird et al. .......................... | 915/500 |
| 5,951,696 | * | 9/1999 | Naaseh et al. ....................... | 714/34 |
| 5,968,188 | * | 10/1999 | Rana ..................................... | 714/29 |

OTHER PUBLICATIONS

Journal of IPSJ, vol. 38, No. 10, Oct. 1997 (translation of the relevant part JTAG/EJTAG).

* cited by examiner

Primary Examiner—Thomas Lee
Assistant Examiner—Nguyễñ Xuân Nguyên
(74) Attorney, Agent, or Firm—Burns, Doane, Swecker & Mathis, LLP (57) ABSTRACT

An in-circuit emulator (ICE) including an internal trace memory and a bit-width converter. The internal trace memory is embedded in an ICE CPU to trace CPU internal signals fed from a CPU core that executes the same operations as a CPU of a debugged system. The bit-width converter converts the CPU internal signal, which is read out of the internal trace memory, into a plurality of reduced bit-width signals, and supplies them to an ICE controller outside the chip of the ICE CPU in multiple cycles. The configuration makes it possible to remove the restriction imposed, by the number of terminals of the ICE CPU chip, on the number of bits of the CPU internal signal to be output in parallel, and to overcome the difficulty involved in sampling the internal CPU signals by the trace memory, even if the operation frequency of the ICE CPU increases.

13 Claims, 5 Drawing Sheets

IN-CIRCUIT EMULATOR WITH INTERNAL TRACE MEMORY

BACKGROUND OF THE INVENTION

1. Field of the Invention

The present invention relates to an in-circuit emulator (abbreviated to ICE from now on) that has an observing function of CPU input/output port signals and an execution control function of programs, for supporting debugging of a system equipped with a CPU.

2. Description of Related Art

Figure 6:
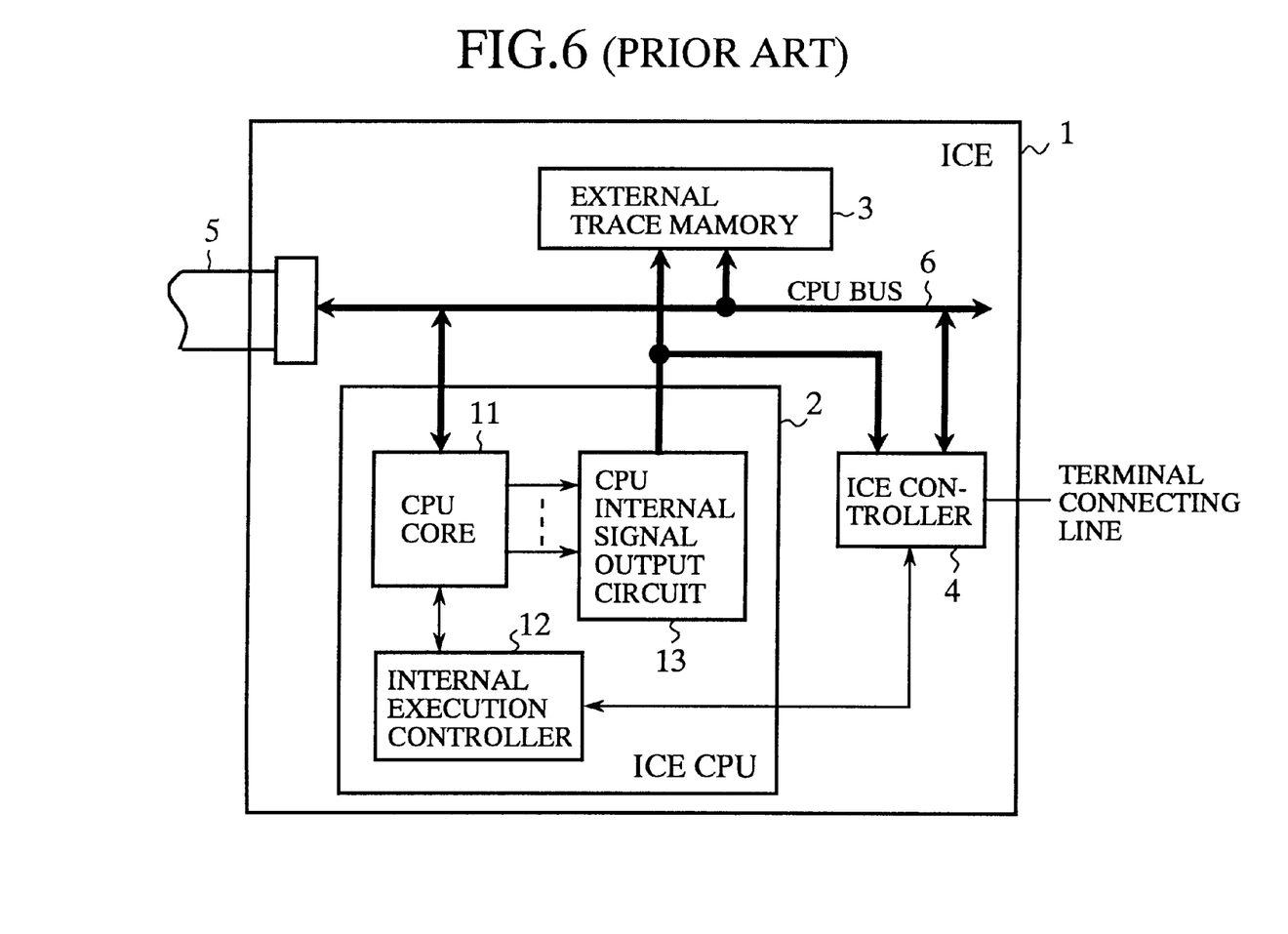
FIG. 6 is a block diagram showing a configuration of a conventional ICE, in conjunction with an internal configuration of its ICE CPU.

FIG. 6 is a block diagram showing a configuration of a conventional ICE together with an internal configuration of an ICE CPU. In FIG. 6, the reference numeral 1 designates an ICE; 2 designates an ICE CPU embedded in the ICE 1; and 3 designates an external trace memory provided outside the ICE CPU 2 for tracing signal logic on input/output ports of the ICE CPU 2. The reference numeral 4 designates an ICE controller for carrying out the execution control of the ICE CPU 2, the control of the external trace memory 3 and the interface with terminal equipment not shown in this figure; 5 designates a processor probe consisting of a cable for connecting the ICE 1 to connection ports of a system board to be debugged; and 6 designates a CPU bus for interconnecting the external trace memory 3, ICE controller 4 and processor probe 5.

In the ICE CPU 2, the reference numeral 11 designates a CPU core 11 constituting a kernel of the ICE CPU 2; 12 designates an internal execution controller for controlling the operation of the CPU core 11; and 13 designates a CPU internal signal output circuit for outputting the internal state of the CPU core 11.

Next, the operation of the conventional ICE will be described.

The CPU core 11 in the ICE CPU 2 is a CPU for carrying out the same operation as that of the CPU on a system board to be debugged. To use the ICE 1, the CPU on the system board is removed, and the input/output ports of that CPU is connected with the ICE 1 via the processor probe 5. Subsequently, the CPU core 11 of the ICE CPU 2 in the ICE 1 is caused to operate in place of the CPU to be debugged.

In the ICE CPU 2, the CPU internal signal output circuit 13 supplies, in synchronism with a clock signal, the external trace memory 3 and the ICE controller 4 with the signal logic on the input/output ports of the CPU core 11, which operates under the execution control of the internal execution controller 12, as CPU internal signals. The external trace memory 3 samples at every clock interval the signal voltage levels of the CPU internal signals fed from the CPU internal signal output circuit 13, and stores the sampled results. Using the external trace memory 3, the ICE 1 implements the observing function of the input/output port signals of the CPU 2.

Techniques relevant to such a conventional ICE are disclosed in Japanese patent application laid-open Nos. 63-188245/1988 and 2-133834/1990, for example.

In the conventional ICE 1 with such a configuration, the number of the chip terminals of the ICE CPU 2 is restricted, and this presents problems of limiting the number of bits of the CPU internal signals that can be output in parallel, and of making it difficult for the external trace memory 3 to sample at every clock interval the signal waveforms of the CPU internal signals output from the CPU internal signal output circuit 13, when the operation frequency of the ICE CPU 2 increases.

SUMMARY OF THE INVENTION

The present invention is implemented to solve the foregoing problems. It is therefore an object of the present invention to provide an ICE with a trace memory embedded in the ICE CPU, which enables the CPU internal signals to be output in parallel independently of the number of the chip terminals of the ICE CPU, and enables the trace memory to sample the CPU internal signals with ease in spite of a high operation frequency of the ICE CPU.

According to one aspect of the present invention, there is provided an in-circuit emulator for supporting debugging of a debugged system including a CPU, the in-circuit emulator having an observing function of signals on input/output ports of the CPU, and a function of carrying out execution control of a program, the in-circuit emulator comprising: a processor probe for connecting the in-circuit emulator to the input/output ports of the CPU on a board of the debugged system; an in-circuit emulator CPU embedded in the in-circuit emulator for implementing operations equivalent to those of the CPU of the debugged system; and an in-circuit emulator controller for controlling execution processing of the in-circuit emulator CPU, wherein the in-circuit emulator CPU comprises: a CPU core that carries out processing operations equivalent to those of the CPU of the debugged system; an internal trace memory for tracing a CPU internal signal of the CPU core; and a CPU internal signal output circuit for supplying the S trace memory with the CPU internal signal of the CPU core in synchronism with a clock signal.

Here, the in-circuit emulator CPU may further comprise a bit-width converter for converting the CPU internal signal, which is read out of the internal trace memory, into a plurality of reduced bit-width signals, each having a bit number less than that of the CPU internal signal, and supplies them to the in-circuit emulator controller in multiple cycles.

The in-circuit emulator CPU may further comprise an internal execution control circuit for exchanging a signal with the in-circuit emulator controller, and for controlling execution of the processing operations of the CPU core in response to the signal exchanged.

The internal trace memory of the in-circuit emulator CPU may comprise at least two DRAM cell arrays, one of which is preparing for writing, while the other of which is writing.

The in-circuit emulator CPU may further comprise a tracing halt controller for halting writing of the CPU internal signal into the internal trace memory in response to contents of the CPU internal signal fed from the CPU internal signal output circuit.

The in-circuit emulator may further comprise an external signal probe for bringing, as an external signal, into the in-circuit emulator a signal other than signals of the CPU on the board of the debugged system, wherein the CPU internal signal output circuit in the in-circuit emulator CPU may have a function of receiving the external signal through the external signal probe, and supply it to the internal trace memory and the trace halt controller.

DETAILED DESCRIPTION OF THE PREFERRED EMBODIMENTS

The invention will now be described with reference to the accompanying drawings.

EMBODIMENT 1

Figure 1:
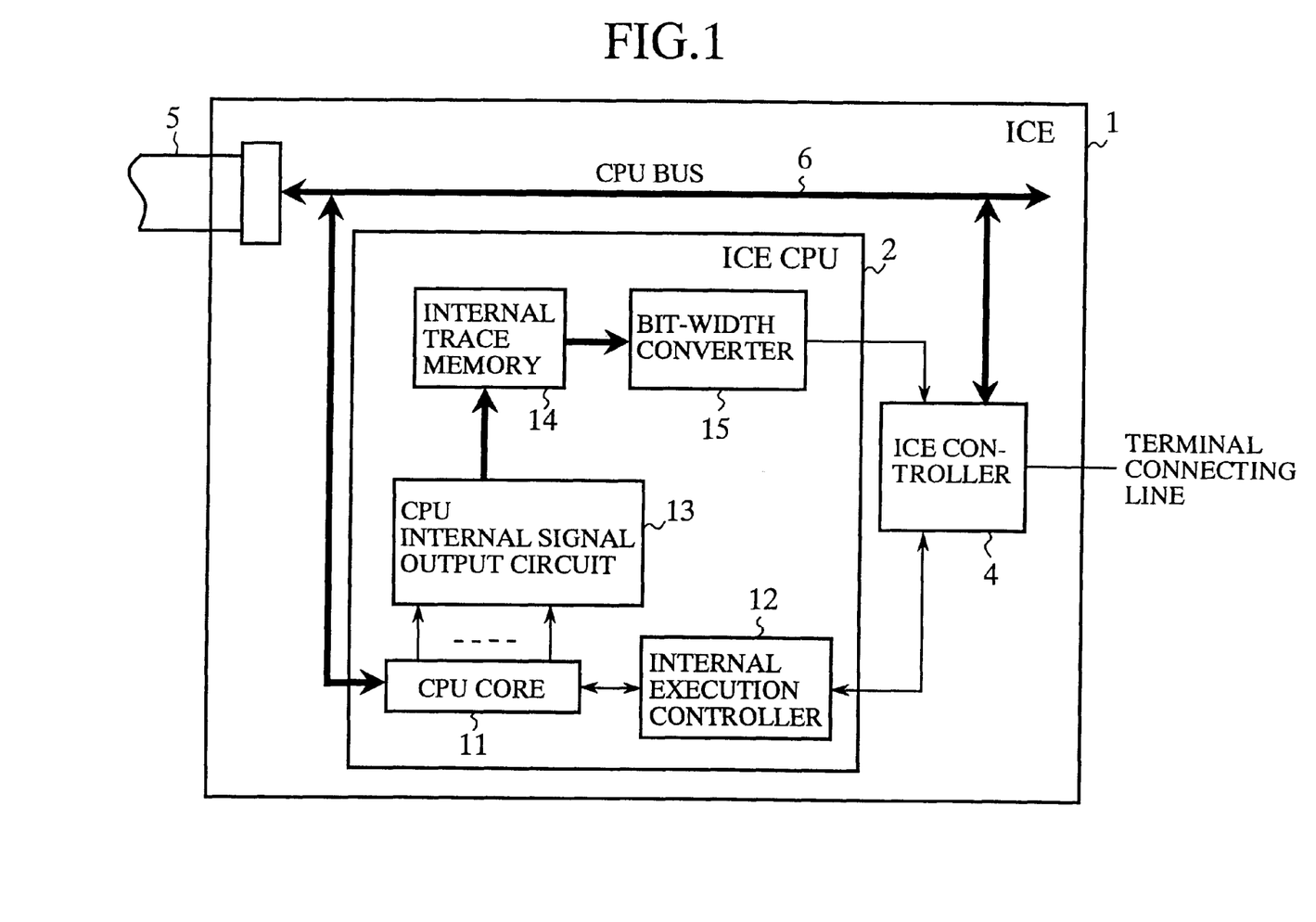
FIG. 1 is a block diagram showing a configuration of an embodiment 1 of an ICE in accordance with the present invention, in conjunction with an internal configuration of its ICE CPU.

FIG. 1 is a block diagram showing a configuration of an embodiment 1 of the ICE in accordance with the present invention, in conjunction with an internal configuration of its ICE CPU. In this figure, the reference numeral 1 designates an ICE for supporting debugging of a system to be debugged, on which a CPU is mounted; and 2 designates a ICE CPU embedded in the ICE 1 for carrying out the same operation as that of the CPU in the debugged system. The reference numeral 4 designates an ICE controller for controlling the operation of the ICE CPU 2, and for interfacing between the ICE CPU 2 and terminal equipment not shown in this figure; 5 designates a processor probe consisting of a cable for connecting the ICE 1 to the input/output ports of the CPU of the debugged system; and 6 designates a CPU bus for interconnecting the ICE CPU 2, ICE controller 4 and processor probe 5. These blocks correspond to those of FIG. 6 designated by the same reference numerals.

In the ICE CPU 2, the reference numeral 11 designates a CPU core that constitutes the kernel of the ICE CPU 2, and executes the same operation as that of the CPU in the debugged system. The reference numeral 12 designates an internal execution controller that exchanges signals with the ICE controller 4, and controls the operation of the CPU core 11 in response to the signals; and 13 designates a CPU internal signal output circuit for outputting, in synchronization with a clock signal, CPU internal signals that indicate the internal state of the CPU core 11. The reference numeral 14 designates an internal trace memory that is provided in the ICE CPU 2 in place of the conventional external trace memory 3, samples the CPU internal signals at every clock interval, and stores the sampled data to trace the CPU internal signals of the CPU core 11 produced from the CPU internal signal output circuit 13. The reference numeral 15 designates a bitwidth converter that converts each of the CPU internal signals with a broad bit-width read from the internal trace memory 14 into CPU internal signals with a narrow bit-width, and outputs them to the ICE controller 4 in multiple cycles. The CPU core 11, internal execution controller 12 and CPU internal signal output circuit 13 are also correspond to those of FIG. 6 designated by the same reference numerals.

The present embodiment 1 of the ICE in accordance with the present invention differs from the conventional ICE in that it includes in the ICE CPU 2 the internal trace memory 14 in place of the external trace memory 3 which was disposed outside the ICE CPU 2, and that it comprises the bit-width converter 15 for converting each of the wide bit-width CPU internal signals read from the internal trace memory 14 to the narrow bit-width CPU internal signals to be supplied to the ICE controller 4.

Figure 2:
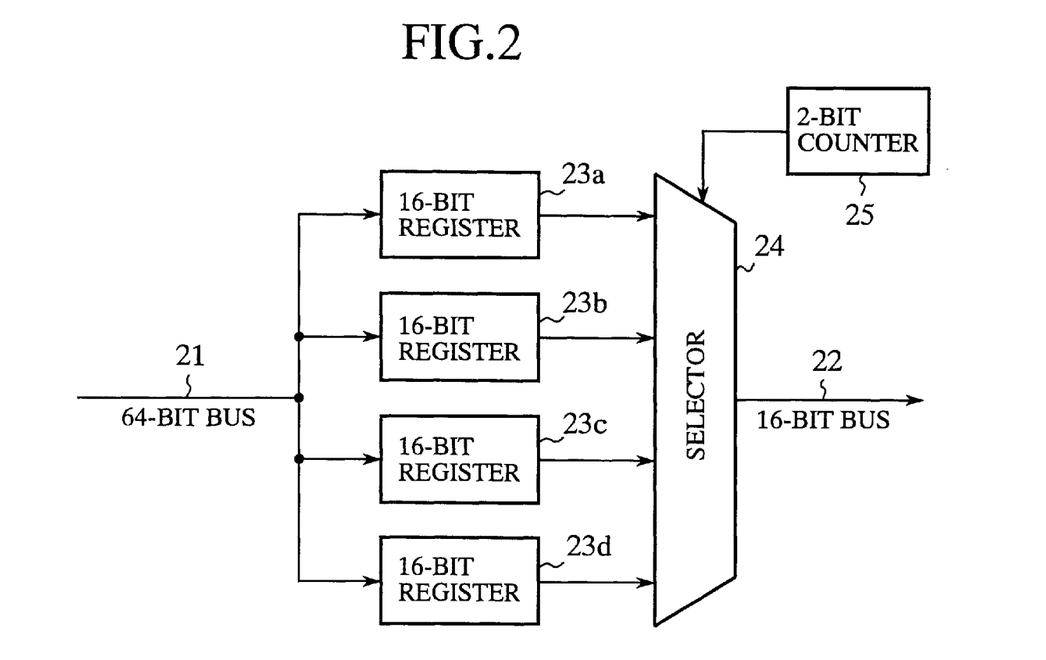
FIG. 2 is a block diagram showing a configuration of a bit-width conter in the embodiment 1.

FIG. 2 is a block diagram showing a configuration of the bit-width converter 15 that divides an input signal on a 64-bit bus into four 16-bit signals, and supplies them to a 16-bit bus in four cycles.

In FIG. 2, the reference numeral 21 designates the 64-bit bus; 22 designates the 16-bit bus; and reference numerals 23a–23d each designate a 16-bit register for holding one of the four the 16-bit signals obtained by dividing the 64-bit signal. The reference numeral 24 designates a selector that selects one of the four 16-bit registers 23a–23d, and sequentially outputs the four 16-bit data stored therein to the 16-bit bus 22 in four cycles; and 25 designates a 2-bit counter for generating a signal for controlling the selection of the selector 24.

Next, the operation of the present embodiment 1 will be described.

To use the ICE 1, the CPU on the board of the debugged system is removed, and the input/output ports of the CPU are connected with the ICE 1 via the processor probe 5 as in the conventional ICE. Subsequently, the CPU core 11 of the ICE CPU 2 in the ICE 1 executes the processing in behalf of the CPU of the debugged system. Thus, in the ICE CPU 2, the processing operation of the CPU core 11 undergoes control of the internal execution controller 12 that exchanges signals with the ICE controller 4.

The signal logic on the input/output ports of the CPU core 11 during the processing operation is supplied from the CPU internal signal output circuit 13 to the internal trace memory 14 as CPU internal signals in synchronism with the clock signal. The internal trace memory 14 samples the CPU internal signals by comparing their signal voltage levels with a threshold voltage at every clock interval to determine their binary values as logic signal values, and stores the sampled results. Thus, the ICE 1 implements the observing function of the signals on the input/output ports of the CPU using the internal trace memory 14.

Each of the CPU internal signals read from the internal trace memory 14 undergoes the bit-width conversion by the bit-width converter 15, and the converted signals are each output to the ICE controller 4 in multiple cycles. More specifically, the bit-width converter 15 divides into four 16-bit signals the 64-bit CPU internal signal the internal trace memory 14 reads and places on the 64-bit bus 21, and stores them in the 16-bit registers 23a–23d. The selector 24 sequentially selects one of the 16-bit registers 23a–23d in response to the count value of the 2-bit counter 25, which recurs in four cycles, and supplies the 16-bit bus 22 with the data stored therein. Thus, the 64-bit CPU internal signal read from the internal trace memory 14 is transferred to the ICE controller 4 via the 16-bit bus 22 in four cycles.

As described above, the internal trace memory 14 is embedded in the chip of the ICE CPU 2 as the trace memory in the present embodiment 1. This offers an advantage of being able to remove the restriction imposed on the number of bits of the CPU internal signals due to the number of connection terminals, which takes place in the conventional ICE that connects the CPU internal signal output circuit 13 with the external trace memory 3 via the connection terminals, thereby enabling the CPU internal signals with the broad bit-width to be traced. Besides, the signal lines from the CPU internal signal output circuit 13 to the internal trace memory 14 are shortened in the present embodiment 1. This enables the CPU internal signals to be released from the attenuation and the restriction in the traceable frequency due to large stray capacitance of the signal lines, which takes place in the conventional ICE employing the external trace memory 3. Thus, the present embodiment 1 has an advantage of being able to achieve the tracing at a higher frequency.

Furthermore, the present embodiment 1 connects the internal trace memory 14 with the ICE controller 4 via the bit-width converter 15. This offers an advantage of being able to connect it with the ICE controller 4 at an optimum bit-width, taking account of the number of connection terminals of the chip of the ICE CPU 2 or the state of the ICE controller 4.

EMBODIMENT 2

The present embodiment 2 solves a problem involved in the foregoing embodiment 1 in that when the internal trace memory 14 is placed inside the chip of the ICE CPU 2, the traceable span of the data stored in the internal trace memory 14 is limited because of its small capacity due to the restriction of the chip area. The problem is solved by forming the internal trace memory 14 with a plurality of DRAM cell arrays which makes it possible to implement a large capacity internal trace memory 14 with a small memory area.

Figure 3:
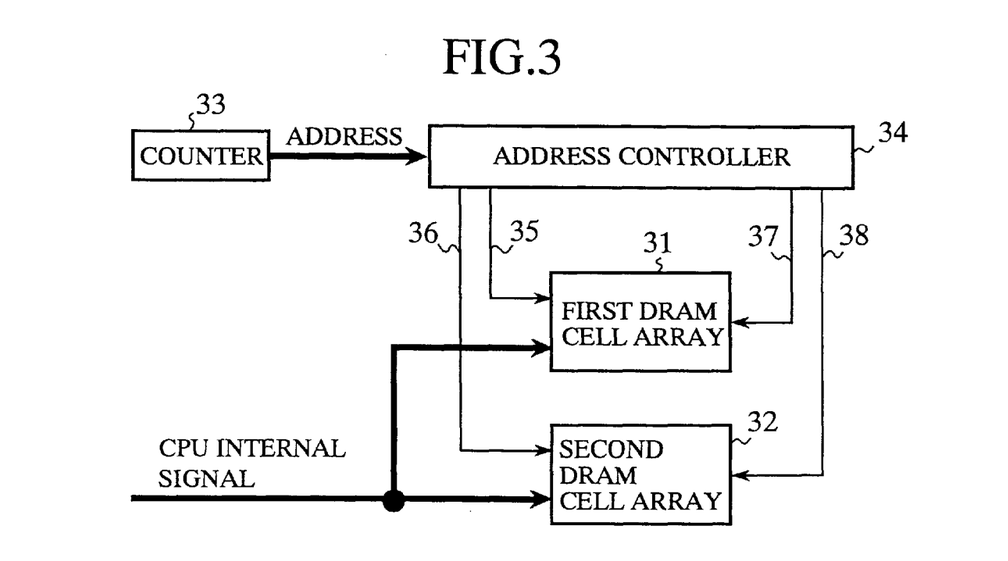
FIG. 3 is a block diagram showing a configuration of an internal trace memory applied to an embodiment 2 of the ICE in accordance with the present invention.

FIG. 3 is a block diagram showing a configuration of the internal trace memory 14 employed in the ICE CPU 2 of the present embodiment 2 of the ICE in accordance with the present invention. In FIG. 3, the reference numeral 31 designates a first DRAM cell array capable of implementing a large capacity memory with a small area; 32 designates a like second DRAM cell array; and 33 designates a counter for generating continuous addresses on the DRAM cell arrays 31 and 32. The reference numeral 34 designates an address controller for controlling the first DRAM cell array 31 and second DRAM cell array 32 such that writing of them is alternately carried out: when one of them is writing, the other of them is preparing for the next write. Reference numerals 35 and 36 each designate an address bus for the address controller 34 to designate the address of the first DRAM cell array 31 or second DRAM cell array 32; and 37 and 38 each designate control signal lines for transferring from the address controller 34 to the first DRAM cell array 31 or second DRAM cell array 32 control signals such as a RAS (row address select) signal, CAS (column address select) signal, WE (write enable) signal and OE (output enable) signal.

Next, the operation of the present embodiment 2 will be described.

Generally, the DRAM cell arrays provide the row address and column address sequentially through a single address bus, thereby requiring at least two clock cycles to access the memory. This means that a single DRAM cell array is not enough for data to be written at every clock interval. Considering this, the present embodiment 2 comprises two DRAM cell arrays, the first DRAM cell array 31 and the second DRAM cell array 32, to carry out the writing at every clock interval in such a manner that while one of them is writing, the other of them is preparing for the next writing.

In the internal trace memory 14 employing the two DRAM cell arrays, the counter 33 generates continuous addresses, and the address controller 34 carries out the following processings:

(1) If the row address is an odd number, the address controller 34 provides the first DRAM cell array 31 with the column address via the address bus 35, and a data write command via the control signal lines 37. In addition, it supplies the second DRAM cell array 32 with the next row address via the address bus 36 by incrementing the current row address by one.

(2) If the row address is an even number, the address controller 34 provides the first DRAM cell array 31 with the next row address via the address bus 35 by incrementing the current row address by one. In addition, it supplies the second DRAM cell array 32 with the column address via the address bus 36, and the data write command via the control signal lines 38.

Thus, the second DRAM cell array 32 is preparing for the next write, while the first DRAM cell array 31 is writing, and vice versa. This means that writing to the first DRAM cell array 31 or second DRAM cell array 32 is carried out alternately at every clock interval, achieving the writing of the internal trace memory 14 at every clock interval.

According to the present embodiment 2, the large capacity internal trace memory 14 can be implemented with a small area by applying the DRAM cell arrays. This offers an advantage of achieving tracing over a long span without increasing the write interval because the internal trace memory 14 is divided into the first DRAM cell array 31 and second DRAM cell array 32, which enables the writing at every clock interval.

EMBODIMENT 3

When the ICE controller 4 accesses the internal trace memory 14 inside the chip of the ICE CPU 2 in the foregoing embodiment 1, the ICE controller 4 must control the ICE CPU 2 by sending it a command to halt the writing of trace data (that is, the CPU internal signals) into the internal trace memory 14. Halting of the writing, however, can also be achieved in accordance with the contents of the trace data written in the internal trace memory 14.

Figure 4:
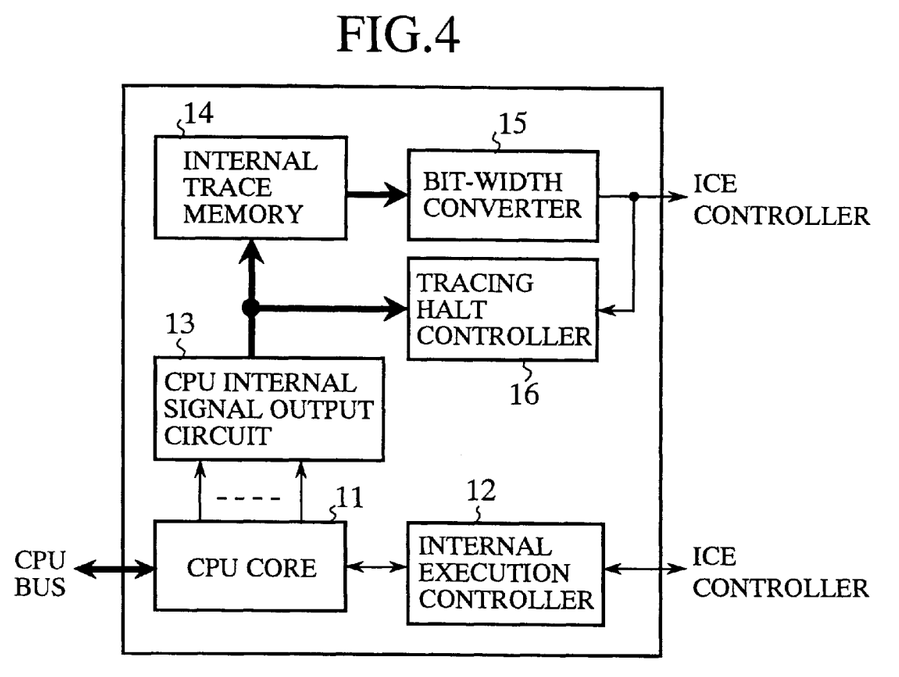
FIG. 4 is a block diagram showing a configuration of an ICE CPU applied to an embodiment 3 of the ICE in accordance with the present invention.

FIG. 4 is a block diagram showing an internal configuration of the ICE CPU 2 in the present embodiment 3 of the ICE in accordance with the present invention, in which corresponding portions to those of FIG. 1 are designated by the same reference numerals and the description thereof is omitted here. In FIG. 4, the reference numeral 16 designates a tracing halt controller 16 that receives from the CPU internal signal output circuit 13 in the ICE CPU 2 the CPU internal signals (trace data) indicating the internal state of the CPU core 11, and halts the writing of the trace data into the internal trace memory 14 in response to the internal state of the CPU core Next, the operation of the present embodiment 3 will be described.

To make an access from the ICE controller 4 to the internal trace memory 14 inside the chip of the ICE CPU 2, the trace data write must be stopped. To achieve this in the foregoing embodiment 1, the ICE CPU 2 is controlled by a command from the ICE controller 4 outside the chip of the ICE CPU 2. With such an arrangement, however, the data write into the internal trace memory 14 cannot be halted in accordance with the internal state of the CPU core 11. Thus, the present embodiment 3 has the tracing halt controller 16 so that the writing of the trace data into the internal trace memory 14 can be halted depending on the internal state of the CPU core 11.

More specifically, the CPU internal signal output circuit 13 reads the signal logic on the input/output ports of the CPU core 11 in synchronism with the clock signal during its processing operation, and supplies the signal logic to the internal trace memory 14 as the trace data. The trace data is also supplied to the tracing halt controller 16. Receiving the trace data from the CPU internal signal output circuit 13, the tracing halt controller 16 carries out the write halt control of the trace data in accordance with the contents of the data, that is, with the internal state of the CPU core 11. In this case, since the tracing halt controller 16 can be controlled from the ICE controller 4 through signal lines that are also used as the data read lines from the internal trace memory 14, the write halt control of the trace data into the internal trace memory 14 can be achieved by the command from the ICE controller 4, as well.

According to the present embodiment 3, since the tracing halt controller 16 is provided to carry out the halt control of writing the trace data into the internal trace memory 14 depending on its contents, the tracing can be stopped not only by the control of the ICE controller 4 from the outside of the chip of the ICE CPU 2, but also in response to the internal state of the CPU core 11. In addition, the present embodiment has an advantage of being able to achieve this without increasing the number of the connection terminals of the ICE CPU 2, because the read lines of the trace data are also used as the signal lines of the tracing halt controller 16.

EMBODIMENT 4

Although the foregoing embodiments 1–3 handle the tracing of the signal logic (CPU internal signal) on the input/output ports of the CPU core 11 in the ICE CPU 2, it is also possible to trace signal values other than the input/output signals of the CPU of the debugged system, or to control the CPU using one of the signal values as a trigger.

Figure 5:
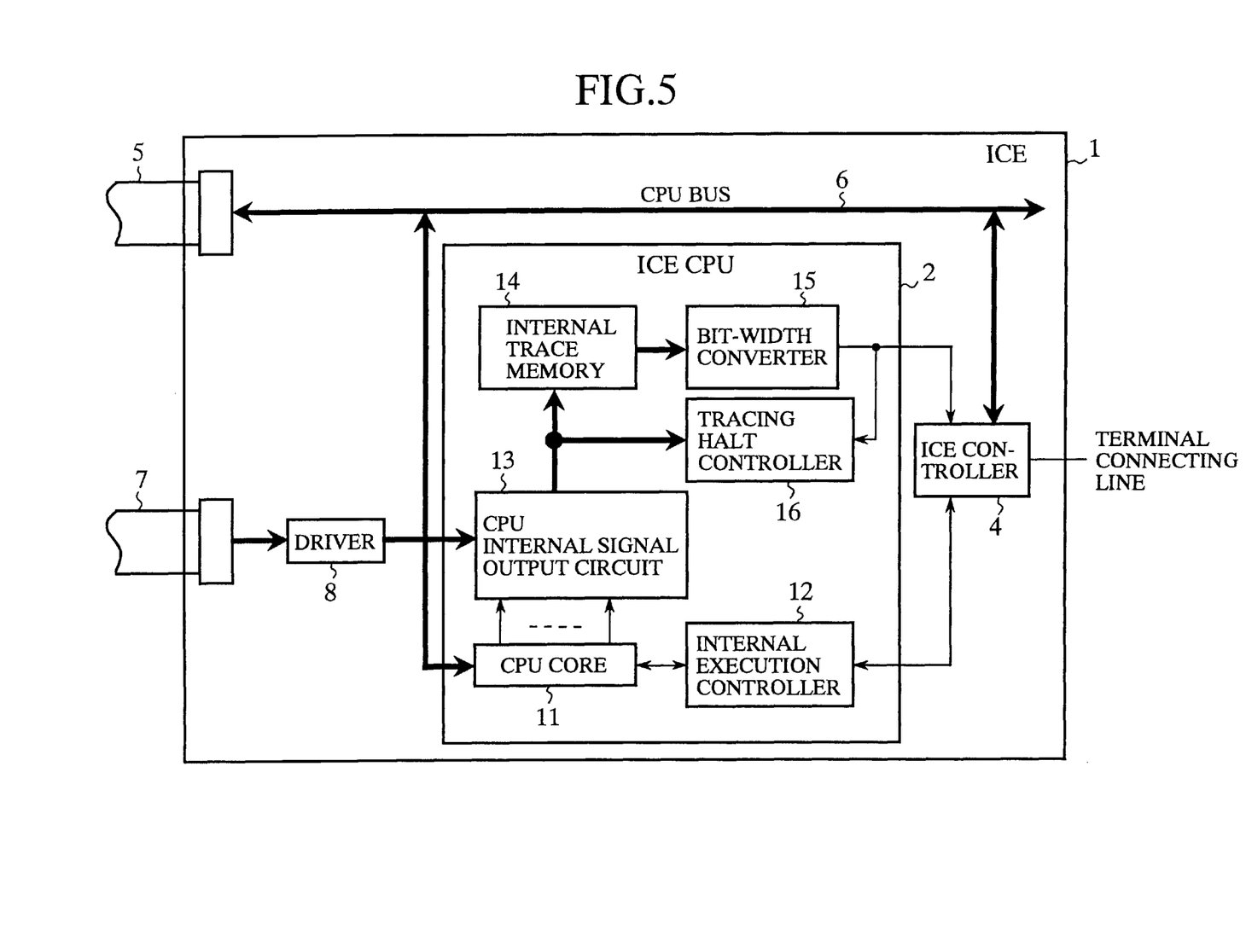
FIG. 5 is a block diagram showing a configuration of an embodiment 4 of the ICE in accordance with the present invention, in conjunction with an internal configuration of its ICE CPU.

FIG. 5 is a block diagram showing such an embodiment 4 of the ICE in accordance with the present invention, in conjunction with the internal configuration of the ICE CPU, in which the corresponding portions to those of FIGS. 1 and 4 are designated by the same reference numerals, and the description thereof is omitted here. In FIG. 5, the reference numeral 7 designates an external signal probe consisting of a cable for bringing into the ICE 1 a signal other than the input/output signals of the CPU on the board of the debugged system; and 8 designates a driver for connecting the signal acquired through the external signal probe 7 to the ICE CPU 2. The CPU internal signal output circuit 13 disposed in the ICE CPU 2 differs from that of FIG. 4 in that it receives through the driver 8 the signal acquired via the external signal probe 7, and supplies it to the internal trace memory 14 and tracing halt controller 16.

Next, the operation of the present embodiment 4 will be described.

Although the foregoing embodiments 1–3 can trace the signal logic (CPU internal signals) on the input/output ports of the CPU core 11 in the ICE CPU 2, it is impossible for them to trace signal values other than the input/output signals of the CPU of the debugged system, or to control the CPU using one of the signal values as a trigger. In view of this, the present embodiment 4 connects the external signal probe 7 to a connection terminal other than the input/output terminals of the CPU of the debugged system to bring into the ICE 1 any signal other than the input/output signals of the CPU, as an external signal. The external signal acquired through the external signal probe 7 is connected to the ICE CPU 2 via the driver 8.

In the ICE CPU 2, receiving the external signal from the external signal probe 7 via the driver 8, the CPU internal signal output circuit 13 supplies it to the internal trace memory 14 and tracing halt controller 16. The internal trace memory 14 samples the external signal at every clock interval, and stores the sampled results as in the case of the CPU internal signal indicating the internal state of the CPU core 11. On the other hand, the tracing halt controller 16 enables the tracing to be halted not only by the internal state of the CPU core 11, but also by the external signal from the external signal probe 7.

According to the present embodiment 4, it becomes possible to trace a signal other than the input/output signals of the CPU of the debugged system, because the signal is brought into the ICE CPU 2 in the ICE 1 through the external signal probe 7. In addition, the present embodiment 4 has an advantage of being able to control the CPU using the signal as a trigger.

What is claimed is:

1. An in-circuit emulator for supporting debugging of a debugged system including a CPU, the in-circuit emulator having an observing function of signals on input/output ports of said CPU, and a function of carrying out execution control of a program, said in-circuit emulator comprising:
   a processor probe for connecting said in-circuit emulator to the input/output ports of said CPU on a board of said debugged system;
   an in-circuit emulator CPU embedded in said in-circuit emulator for implementing operations equivalent to those of said CPU of said debugged system; and
   an in-circuit emulator controller for controlling execution processing of said in-circuit emulator CPU, wherein said in-circuit emulator CPU comprises:
   a CPU core that carries out processing operations equivalent to those of said CPU of said debugged system;
   an internal trace memory for tracing a CPU internal signal of said CPU core; and
   a CPU internal signal output circuit for supplying said trace memory with the CPU internal signal of said CPU core in synchronism with a clock signal.

2. The in-circuit emulator as claimed in claim 1, wherein said in-circuit emulator CPU further comprises a bit-width converter for converting the CPU internal signal, which is read out of said internal trace memory, into a plurality of reduced bit-width signals, each having a bit number less than that of said CPU internal signal, and supplies them to said in-circuit emulator controller in multiple cycles.

3. The in-circuit emulator as claimed in claim 2, wherein said in-circuit emulator CPU further comprises an internal execution control circuit for exchanging a signal with said in-circuit emulator controller, and for controlling execution of the processing operations of said CPU core in response to the signal exchanged.

4. The in-circuit emulator as claimed in claim 3, wherein said internal trace memory of said in-circuit emulator CPU comprises at least two DRAM cell arrays, one of which is preparing for writing, while the other of which is writing.

5. The in-circuit emulator as claimed in claim 3, wherein said in-circuit emulator CPU further comprises a tracing halt controller for halting writing of said CPU internal signal into said internal trace memory in response to contents of said CPU internal signal fed from said CPU internal signal output circuit.

6. The in-circuit emulator as claimed in claim 5, further comprising an external signal probe for bringing, as an external signal, into said in-circuit emulator a signal other than signals of said CPU on the board of said debugged system, wherein said CPU internal signal output circuit in said in-circuit emulator CPU has a function of receiving said external signal through said external signal probe, and supplies it to said internal trace memory and said trace halt controller.

7. A. The in-circuit emulator as claimed in claim 1, wherein said internal trace memory of said in-circuit emulator CPU comprises at least two DRAM cell arrays, one of which is preparing for writing, while the other of which is writing.

8. The in-circuit emulator as claimed in claim 1, wherein said in-circuit emulator CPU further comprises a tracing halt controller for halting writing of said CPU internal signal into said internal trace memory in response to contents of said CPU internal signal fed from said CPU internal signal output circuit.

9. The in-circuit emulator as claimed in claim 8, further comprising an external signal probe for bringing, as an external signal, into said in-circuit emulator a signal other than signals of said CPU on the board of said debugged system, wherein said CPU internal signal output circuit in said in-circuit emulator CPU has a function of receiving said external signal through said external signal probe, and supplies it to said internal trace memory and said trace halt controller.

10. An in-circuit emulator for supporting debugging of a debugged system including a CPU, the in-circuit emulator having an observing function of signals on input/output ports of said CPU, and a function of carrying out execution control of a program, said in-circuit emulator comprising:

a processor probe for connecting said in-circuit emulator to the input/output ports of said CPU on a board of said debugged system;

a CPU bus connected to said processor probe;

an in-circuit emulator controller for exchanging a signal with said CPU bus; and an in-circuit emulator CPU whose operations are controlled by said in-circuit emulator controller, wherein, said in-circuit emulator CPU further includes:

a CPU core that carries out processing operations equivalent to those of said CPU of said debugged systems, an internal trace memory for tracing a CPU internal signal of said CPU core, a CPU internal signal output circuit for supplying said internal trace memory with the CPU internal signal of said CPU core in synchronism with a clock signal, a bit-width converter for converting the CPU internal signal, which is read out of said internal trace memory, into a plurality of reduced bit-width signals, each having a bit number less than that of said CPU internal signal, and supplies them to said in-circuit emulator controller in multiple cycles, and an internal execution emulator control circuit for exchanging a signal with said in-circuit emulator controller, and for controlling execution of the processing operations of said CPU core in response to the signal exchanged.

11. The in-circuit emulator as claimed in claim 10, wherein said internal trace memory of said in-circuit emulator CPU comprises at least two DRAM cell arrays, one of which is preparing for writing, while the other of which is writing.

12. The in-circuit emulator as claimed in claim 10, wherein said in-circuit emulator CPU further comprises a tracing halt controller for halting writing of said CPU internal signal into said internal trace memory in response to contents of said CPU internal signal fed from said CPU internal signal output circuit.

13. The in-circuit emulator as claimed in claim 12, wherein said CPU internal signal output circuit in said in-circuit emulator CPU has a function of receiving an external signal through an external signal probe other than said processor probe provided in said in-circuit emulator, and supplies it to said internal trace memory and said trace halt controller.

\* \* \* \* \*